Nov. 16, 1926.
F. J. BRAINARD
BASKET HANDLE
Filed June 17, 1926
1,607,233
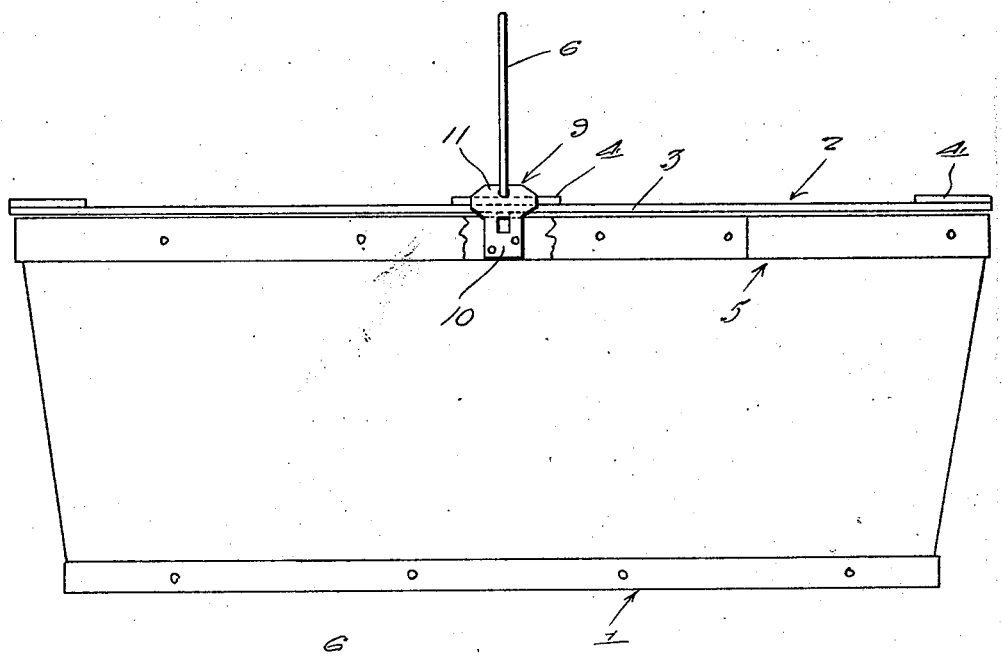
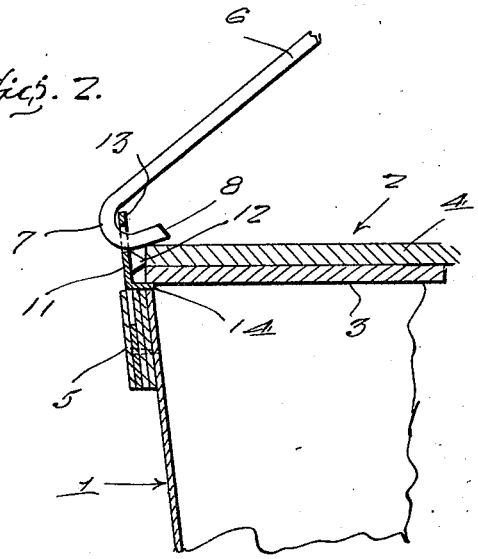
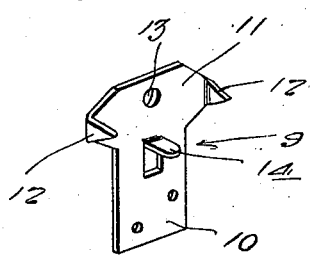
Inventor
F. J. Brainard
By Clarence A. O'Brien
Attorney Patented Nov. 16, 1926.

1,607,233

UNITED STATES PATENT OFFICE.

FOREST J. BRAINARD, OF BROCTON, NEW YORK.

BASKET HANDLE.

Application filed June 17, 1926. Serial No. 116,642.

This invention relates to an improved handle structure for baskets and is especially, but not necessarily, adapted to be connected with fruit baskets such as for instance, a well known type of grape basket.

Briefly, the invention has reference to an improved bail and novel means for attaching the opposite end portions with the upper part of the basket. I am aware that various structures have been devised for providing a rigidly connected handle with the basket, but as far as I have been able to ascertain, such constructions are comparatively weak and undependable.

What I propose, is an improved structure of this kind which is simple and inexpensive, may be incorporated in the basket structure without undue trouble, and may be entirely depended upon to withstand the strain to which it is subjected with little liability of breaking.

The specific bail and attaching means therefor, will become apparent from the following description and drawings.

In the accompanying drawing forming a part of this application, and in which like numerals are employed to designate like parts throughout the same:—

Figure 1 is a side view of a grape basket equipped with a handle constructed in accordance with the present invention, with portions of the basket broken away to disclose the construction more plainly.

Fig. 2 is an enlarged detail sectional view showing the bail and attaching means therefor.

Fig. 3 is a perspective view of one of the attaching devices.

Referring to the drawing in detail, it will be seen that the reference character 1 designates generally the basket which is of the usual configuration and is constructed of the customary light-weight wood. The cover of the basket is designated by the reference character 2, and this comprises a main body 3 provided with spaced reinforcing cleats 4. Surrounding the top of the basket is the usual laminated reinforcing strip 5.

The bail, which is of resilient wire, is designated by the numeral 6 and as shown better in Fig. 2, the end portions of this wire are bent upon themselves as at 7 to form hooks, the terminals 8 of which extend at the angle shown and are constructed to literally bite into the comparatively soft central cleat 4. The bail may be of any suitable shape to afford a convenient handle.

As before stated, novel attaching devices 9 (see Fig. 3), are provided and each device is in the form of a small metal plate 10, the lower end portion of which is of general rectangular configuration and the upper portion of which is widened, somewhat as at 11. The plate is of course stamped into the shape. The widened upper portion 11 is, in reality, formed by substantially V-shaped wings, the apices of which are bent at right angles as at 12, to form spacing and reinforcing means. The upper side of the plate is also formed with an opening 13 to receive the hooked ends of the bail 6. Moreover, a tongue 14 is struck out from the center of the plate as shown plainly in this figure.

In practice, each attaching device is disposed between the plies of the rim forming strap 5 here represented plainly in Fig. 2, suitable fastenings being passed thru the openings in the device to attach it in the way indicated. In this connection, it will be noticed that the tongues 14 aid in positioning the device, by extending over the upper edges of the rim and the upper edge of the body portion of the basket. In fact, the tongues constitute gages so that the desired portion of the device will project a predetermined distance above the basket and the cover. The protecting portions of the devices are such as to dispose the hooked ends of the bail at a place to permit them to bear firmly upon the central cleat of the cover of the basket.

In this way, when the bail is either upright or in some other position, it serves to hold the cover in place. An important feature of this construction resides in the provision of the pointed extensions or spurs on the ends of the wings of the plates, the points of these spurs being embedded in the edge of the cover as plainly indicated to prevent displacement of the cover and to aid in the distribution of stresses. The resiliency of the bail literally pushes the sharpened spurs into the edge of the cover. Moreover, when the basket is loaded or full, and is suspended by the handle, the mere weight of the loaded basket brings the handle into activity, causing the sharp spurs to literally dig into the edges of the cover and as the spurs are pushed into the edge of the cover, the resiliency of the bail maintains them. Obviously the purpose of embedding spurs is to prevent longitudinal sliding of the cover.

A subordinate purpose of the spurs is to act as spacing and bracing means. In other words, the spurs by bearing against the edge of the cover prevent the upper projecting portions of the bendable parts of the plates from being bent over too far. Another point of construction to be noted is the position of the tongue 14 which forms a rest for the cover and prevents the tongues from being pressed down too hard upon the upper frail edge of the basket and disrupting it.

While the preferred embodiment of the invention has been shown and described, it is to be understood that minor changes coming within the field of invention claimed may be resorted to if desired. Such changes may be in shape, size, and slight re-arrangement of parts. Furthermore, it is understood that while the invention has been shown and described and used in connection with a grape basket, it is adaptable for use with other baskets of this kind, such as are used for holding vegetables and other articles of produce.

Having thus described my invention, what I claim as new is:—

1. In a structure of the class described, in combination, a basket having a laminated rim at its top, attaching plates for a bail interposed between plies of the rim, said plates being provided with inwardly extending tongues, spacing and bracing members, a cover on the basket, and a bail having hooked ends extending through apertures in the plates and resting upon the cover, said cover resting on said tongues, and said bracing members bearing against the peripheral portion of the cover.

2. As a new article of manufacture, an attaching device for a handle-forming bail comprising a plate formed with a bail opening and an inwardly extending tongue adapted to rest upon a basket rim, said plate also including a pair of inwardly extending spacing and bracing extensions, said extensions being disposed in vertical plane and the tongue being disposed in a horizontal plane.

3. As a new article of manufacture, an attaching plate for a handle-forming bail, said plate being of general rectangular configuration and widened at its upper end, the edge portions of the widened part being of V-shaped form to provide wings, the apices of which are bent inwardly at right angles to the body portion of the plate, and a tongue struck out from the central portion of the body of the plate and disposed in a horizontal plane and adapted to form a guide to rest upon the rim of a basket.

In testimony whereof I affix my signature.

FOREST J. BRAINARD.